United States Patent [19]

Weber et al.

[11] 4,328,504

[45] May 4, 1982

[54] OPTICAL SENSING OF INK JET PRINTING

[75] Inventors: Helmut Weber, Augsburg; Peter H. Reitberger, Munich, both of Fed. Rep. of Germany

[73] Assignee: NCR Corporation, Dayton, Ohio

[21] Appl. No.: 197,714

[22] Filed: Oct. 16, 1980

[51] Int. Cl.[3] .............................................. G01D 18/00

[52] U.S. Cl. .................................. 346/75; 346/140 R

[58] Field of Search .............. 346/75, 140 PD, 140 R; 400/126

[56] References Cited

U.S. PATENT DOCUMENTS 4,060,813 11/1977 Yamada et al. ........................ 346/75
4,063,253 12/1977 Ito et al. ................................ 346/75
4,067,019 1/1978 Fleischer et al. ..................... 346/75
4,136,345 1/1979 Neville et al. ........................ 346/75
4,255,754 3/1981 Crean et al. ........................... 346/75

*Primary Examiner*—L. T. Hix
*Assistant Examiner*—W. J. Brady
*Attorney, Agent, or Firm*—J. T. Cavender; Wilbert Hawk, Jr.; George J. Muckenthaler

[57] ABSTRACT

Printing of characters in non-impact manner by means of ink droplets which are driven through the nozzle of an inking device is optically sensed and the existence, the position, the size and the condition of each ink spot or mark are determined. The desired printing signals are generated and input in a signal shaping circuit and these signals are compared with the actual signals from the optical sensor and the ink droplet drive means is changed or altered to correct the printing.

18 Claims, 14 Drawing Figures

OPTICAL SENSING OF INK JET PRINTING

BACKGROUND OF THE INVENTION

In the field of non-impact printing, the most common types of printers have been the thermal printer and the ink jet printer. When the performance of a non-impact printer is compared with that of an impact printer, one of the problems in the non-impact machine has been the control of the printing operation. As is well known, the impact operation depends upon the movement of impact members such as wires or the like and which are typically moved by means of an electromechanical system which is believed to enable a more precise control of the impact members.

The advent of non-impact printing, as in the case of thermal printing, brought out the fact that the heating cycle must be controlled in a manner to obtain maximum repeated operations. Likewise, the control of ink jet printing in at least one form thereof must deal with rapid starting and stopping movement of the ink fluid from a supply of the fluid. In each case, the precise control of the thermal elements an of the ink droplets is necessary to provide for both correct and high-speed printing.

In the matter of ink jet printing, it may be extremely useful to make certain that a clean printed character results from the ink droplets. Several of the problems which have been encountered relate to the existence of the ink droplet, the position of the droplet, the size of the droplet and the property or condition of the ink spot on the record media.

It is therefore proposed to observe the details of the ink jet printing operation by way of sensing or supervising the depositing of the ink droplets on the paper.

Representative prior art in the field of sensing printed indicia includes U.S. Pat. No. 3,562,761, issued to J. J. Stone on Feb. 9, 1971, which discloses drop phasing in ink drop writing apparatus wherein ink emitted by the nozzle is in the form of ink drops which are charged in a tunnel in response to video signals and means are provided for sensing whether or not the ink drops are made to occur with the proper phase to assume the proper charge and, if this is not true, to correct the phase of the vibration of the nozzle whereby the ink drop phasing and charging are corrected.

U.S. Pat. No. 3,761,941, issued to J. A. Robertson on Sept. 25, 1973, discloses phase control for a drop generating and charging system wherein charged drops pass through an electrical deflection field into a catcher, and drops which are uncharged pass undeflected through the field and onto a recording sheet. During non-recording times, a calibrating signal is applied to the charging electrode and the charge is measured by an electrometer. This measurement indicates the phase of drop generation relative to the phase of the calibrating signal and deviations of this relative phase from a desired phase are corrected by adjusting the amplitude of the drop stimulating disturbance applied to the ink jet.

U.S. Pat. No. 3,810,194, issued to K. Tokunaga et al. on May 7, 1974, discloses a device for generating a pulse in response to a droplet formation or movement to synchronize the operation of a deflection means or a pattern generating means of the printer with the pulse from the droplet detecting means. The ink droplet detecting means has an electroconductive plate and a resistor to which the plate is connected to a voltage supply.

U.S. Pat. No. 3,886,564, issued to H. E. Naylor et al. on May 27, 1975, discloses deflection sensors for ink jet printers positioned in a test location downstream from the nozzle means and in proximity to the test path and positioned for sensor coupling with ink drops proceeding in the test path. The sensor means comprises a pair of sensor plates separated by a reference gap located adjacent the test path wherein passage of ink drops induces signals representative of charges of the drops in the sensor plates due to coupling between drops and the sensor plates.

U.S. Pat. No. 3,977,010, issued to B. T. Erickson et al. on Aug. 24, 1976, discloses a dual sensor for a multi-nozzle ink jet comprising electrically conductive sensing means disposed on opposite sides of the ink drop streams and electrically conductive shielding means disposed fore and aft of the sensing means and current amplification means connected to each sensing means. Measurements are made on a jet stream to sense ink droplet alignment, droplet arrival time, charge electrode operation, and charge phasing.

U.S. Pat. No. 4,129,875, issued to S. Ito et al. on Dec. 12, 1978, discloses phase control for an ink printer which uses a detector circuit for detecting the relation between the generation of an ink droplet and the phase of a charging signal on the basis of an output signal of a sensor. A phase shift circuit matches the generation of the ink droplet and the phase of the charging signal and an inhibit circuit inhibits the phase shift circuit from operating for a predetermined period of time.

And, U.S. Pat. No. 4,176,363, issued to T. Kasahara on Nov. 27, 1979, discloses ink jet printing apparatus wherein the print head is shifted to an ink failure preventive ejection position distal from the printing region and has a timer for generating a signal and a detector for detecting the setting of the print head at the ejection position.

SUMMARY OF THE INVENTION

The present invention relates to ink jet printing, and more particularly to a supervising system for observing or sensing the formation of ink droplets on paper or like record media. It is not uncommon by reason of the fluid characteristics of ink and the high speed of the driven ink droplets that the above-mentioned problems or troubles can and do exist in the ink jet printing operations. It is therefore believed that the present invention includes subject matter which eliminates or at least minimizes the problems in ink jet printing.

The existence of an ink mark or spot and then the non-existence of an ink spot on the paper may indicate that the nozzle plate of the ink jet print head requires cleaning or rinsing. Secondly, the actual position of the ink mark may be different from the desired position and this condition may be caused by an improper delay time or an incorrect speed of the ink droplet relative to the speed of the moving print head or like device. A third problem or trouble area may be that the actual size of the ink spot or mark on the paper does not correspond with the desired ink spot size and wherein the ink droplet drive means may require an adjustment in the operation thereof. Additionally, the precise optical properties of the ink spot in regard to the contrast or reflection characteristic may not be within the scope of the specification, and the driving condition can then be altered to correct the condition or else the composition of the ink may be changed to correct for contrast or reflection quality.

In accordance with the present invention, an ink jet print head or like device is caused to be moved in side-to-side manner and the ink in the print head is controlled by means of a driver circuit to cause ink droplets to be ejected through a nozzle and onto the paper or like record media. Input signals are provided to a character generator and the signal output thereof is supplied to a character memory and also to a signal shaping circuit. The shaping circuit determines the shape of the optical signal to be detected and the output signal of the shaping circuit is compared with the actual signal which is sensed or observed by the optical sensing device.

The optical sensing device is preferably a sensing unit associated with the printing element or print head and movable therewith and is capable of detecting the actual position of the ink mark or spot on the paper. While the sensing device may be mounted in horizontal manner on one side with respect to the printing element, there may be a sensing device on either side of the printing element, or the sensing device may be located in a vertical arrangement with the printing element.

When a difference or error condition in the proper printing operation exists, as for example when an ink spot or mark does not exist, the nozzle plate may require cleaning and the optical sensing device may initiate actuation of apparatus for automatic cleaning or rinsing of the plate. Likewise, when the size, position or condition of the ink mark or spot is not correct, the optical sensor may initiate a change or alteration of the ink droplet drive means or the operation thereof to correct the printing of the characters. It is also within the scope of the present invention that, if the above-mentioned change or alteration in the printing operation is not possible to effect correction of the printed characters, an alarm or like audible tone would be generated to notify the operator of the machine.

In view of the above discussion, the principal object of the present invention is to provide a system for supervising the actual printing of ink marks or spots on record media and comparing this printing with the desired marks or spots.

Another object of the present invention is to provide means for sensing the actual ink marks or spots on the record media in printing operations and detecting whether certain parameters of the printing are correct.

An additional object of the present invention is to provide sensing means for detecting printing errors and initiating means for correcting the operation of the printer.

A further object of the present invention is to provide a printing system whereby ink droplets are caused to be driven toward the record media for deposition ink in dot matrix manner and means is provided for supervising the depositing of the marks or spots of ink and determining if the marks of the printed characters are correctly printed.

Additional advantages and features of the present invention will become apparent and fully understood from a reading of the following description taken together with the annexed drawing.

DETAILED DESCRIPTION OF THE INVENTION

Figure 1:
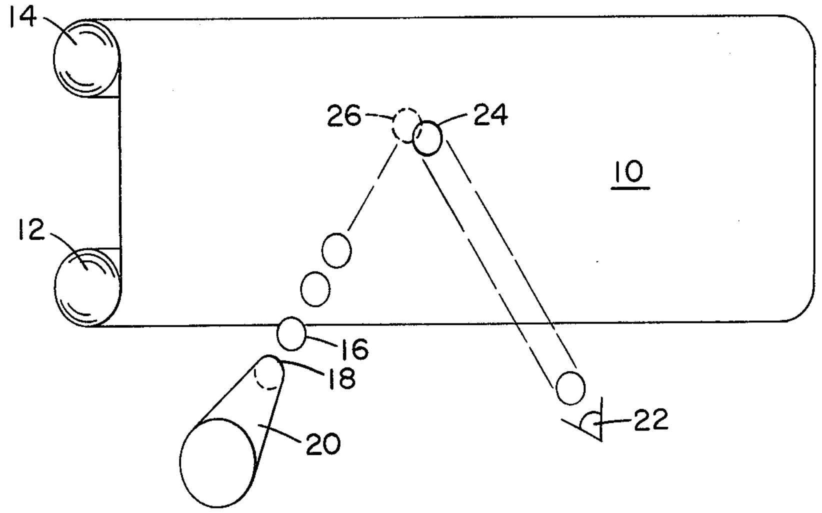
FIG. 1 shows a diagrammatic view of optical sensing of an ink mark or spot.

As seen in schematic form in FIG. 1, paper or like record media 10 is caused to be transported from one roller 12 to another roller 14 and in a plane to receive droplets 16 of ink ejected from the nozzle 18 of a printing element or print head 20. The print head 20 is caused to be driven in well known manner from side to side in a horizontal direction along a line of printing across the printer. The paper 10 moves in a vertical direction after each line of dots is printed in the manner and process of making the characters in dot matrix form.

In the process of making such dot matrix characters it is important that the location of the point of impact of each ink droplet on the paper 10 be exactly determined or supervised so as to insure that a clean printing image is effected in forming each of the characters. The location of such impact points of the ink droplets can be sensed by means of an optical sensing device 22 for detecting the actual position of the ink spot 24 on the paper 10 and wherein the actual position may be at a different location from the desired dot position 26.

Figure 2:
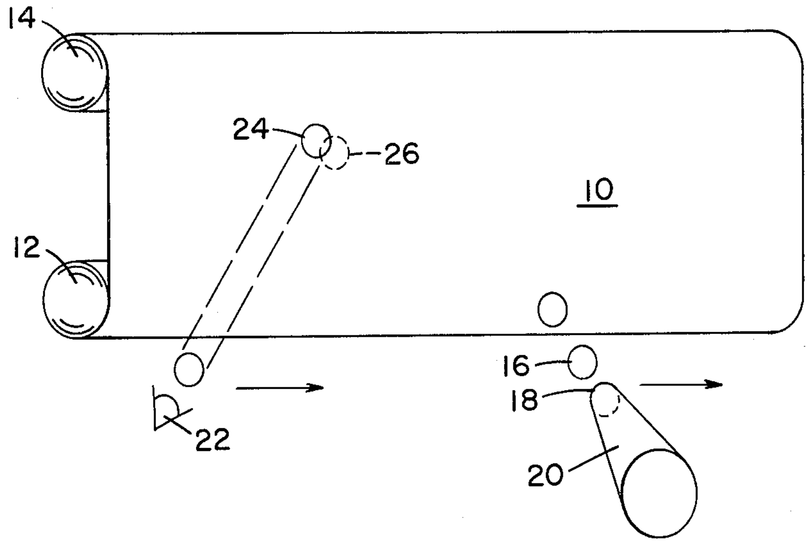
FIG. 2 is a view of the sensing device and the printing element relative to a certain time of operation.

FIG. 2 shows the position of the optical sensing device 22 relative to the print head 20 after the head has moved in the direction of the arrow for a predetermined time and at a certain speed as controlled by the printer control mechanism. In a certain time the sensing unit 22 and the print head 20 are moved a precise distance along the line of printing.

Figure 3:
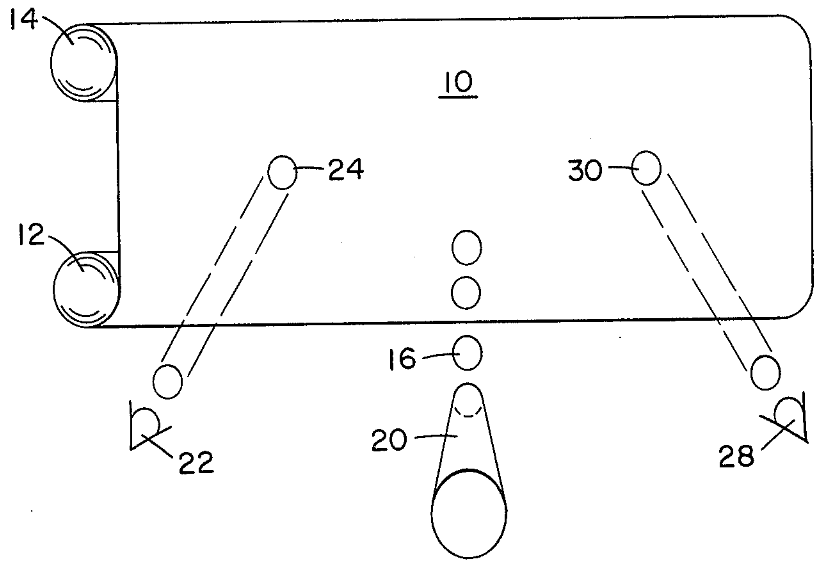
FIG. 3 is a view showing a sensing device on each side of a printing element.

FIG. 3 shows an arrangement wherein the print head 20 ejects an ink droplet 16 onto the paper 10 and the sensing or detecting means includes the optical sensing device 22 for detecting the actual position 24 of an ink spot and includes another optical sensing device 28 for detecting the actual position 30 of an ink spot. In this manner an optical sensing device is positioned on either side of the print head 20 in leading and lagging nature for supervising or observing the printing of dots during both forward and reverse movement of the print head.

Figure 4:
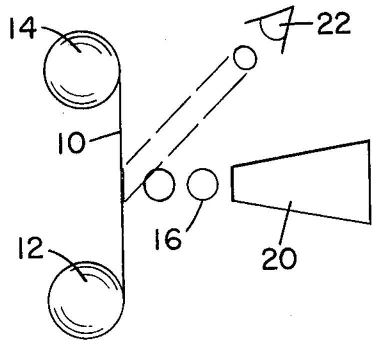
FIG. 4 is a view showing a vertical arrangement of the sensing device and the printing element.

Another arrangement of the apparatus is shown in FIG. 4 wherein the ink jet print head 20 ejects an ink droplet 16 onto the paper 10 carried on rollers 12 and 14 in similar manner as for the previous figures. However, the optical sensing device 22 is positioned in a vertical arrangement above the print head 20 so that the device 22 is positioned independent of the horizontal movement of the print head 20.

The optical sensing of the actual position of the ink droplets or spots 24 on the paper 100 enables the recognizing of trouble sources of the ink jet printing and the diminishing or elimination of the troubles in a subsequent operational manner. For example, if it is desired to print an ink spot or dot at position 26 in FIG. 1, but such ink spot or dot is actually at position 24 as detected by the optical sensing device 22, the consequence of a misplaced ink spot or dot can effect the release of a cleaning agent for the nozzle plate by rinsing thereof or can effect a scraping or like cleaning of the nozzle plate. If the rinsing or scraping procedures do not correct the printing operation, an alarm can be connected to the sensing device to indicate the trouble condition.

Figure 5:
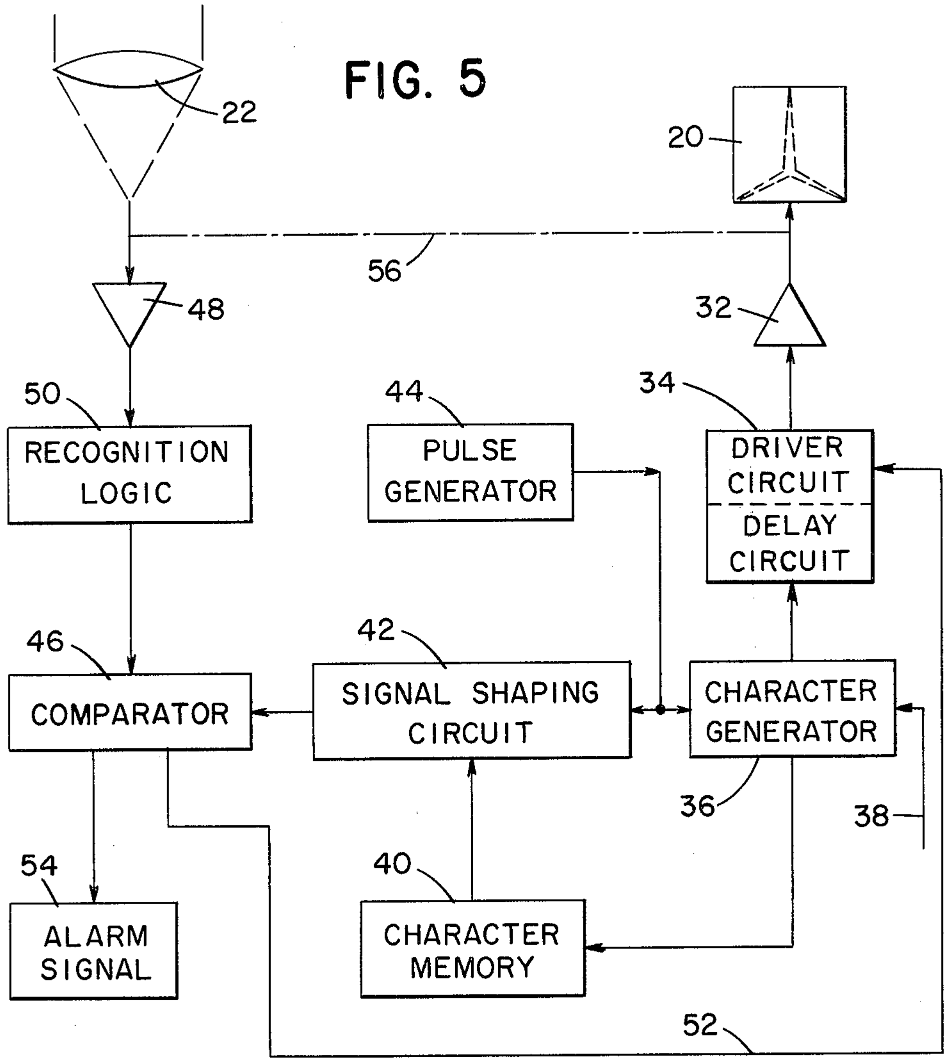
FIG. 5 is a block diagram of the supervisory system of the present invention.

FIG. 5 shows the supervisory system of the present invention for one ink nozzle or spray device wherein the positions of the actual ink spots or dots on the paper 10 are recognized and are compared with desired positions to provide proper operation. The ink jet print head 20, which may be of the well known piezoelectric drive type, is controlled through a power amplifier 32 and a driver circuit 34 from a character generator 36. The input to the generator 36 is by means of a line 38 from an electronic data processing system which supplies the desired signals for printing the characters in dot matrix manner. Such desired signals from the character generator 36 are timely delayed in a character memory 40 and are then supplied to a signal shaping circuit 42. The signals may be subjected to different delay times as hereinafter shown and described. A pulse generator 44 is provided to send signals to the character generator 36 and to the signal shaping circuit 42 to establish a pulsing signal for the driver circuit 34. The signal shaping circuit 42 obtains the necessary information from the desired character signal as to the desired shape of the optical signal to be detected.

The output signal of the signal shaping circuit 42 is supplied to a comparator 46 which compares such output signal with the actual signal of the optical sensing device 22. A preamplifier 48 is provided along with suitable recognition logic 50 for determining and enabling the circuit to identify the ink dot or spot which is seen at the actual physical position. The result of the comparison causes an alteration of the energization of the piezoelectric actuated ink spraying device or print head 20 through the line 52 if there is a deviation from the desired signal. In those cases where the alteration of the energization of the print head 20 does not provide a sufficient correction of the printing, an alarm signal 54 is indicated or sounded for the operator. In effect, the comparator 46 determines whether the signal difference is applied to affect the driver circuit 34 or the alarm signal 54. The tie line 56 indicates that the optical sensing unit 22 moves with the print head 20.

Figure 6:
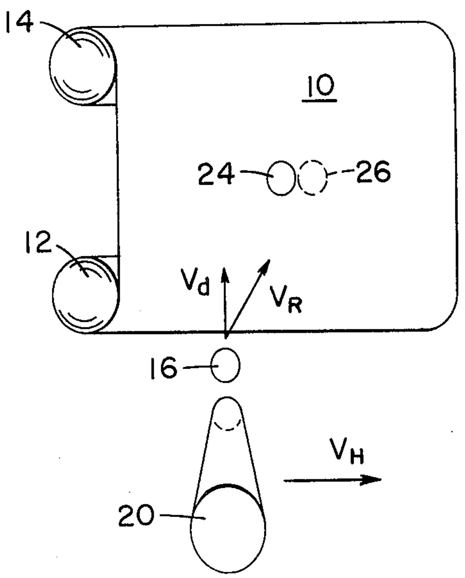
FIG. 6 is a view showing the influence of the speed of the ink droplet on the ink spot position.

As mentioned above, one of the problems associated with ink jet printing is that the actual position 24 (FIGS. 1, 2 and 3) of the ink spot or dot on the paper 10 does not correspond with the desired position 26 of the ink spot. FIG. 6 shows the ink droplet 16 moving at a velocity $V_d$ toward the paper 10 while the print head 20 is moving at a velocity $V_H$ in a direction parallel with the paper and along the line of printing. The resulting velocity $V_R$ determines the point of impact of the ink droplet 16 on the paper 10 in a manner wherein it can be seen that any variation or alteration of one or both of the velocity components can influence the point of impact of the droplets 16. The desired position 26 of the ink spot is seen as being located to the right of the actual position 24. The horizontal drive of the print head 20 determines the velocity $V_H$ whereas the ink droplet velocity $V_d$ is controlled by the energization of the piezoelectric crystal in the print head 20.

Figure 7:
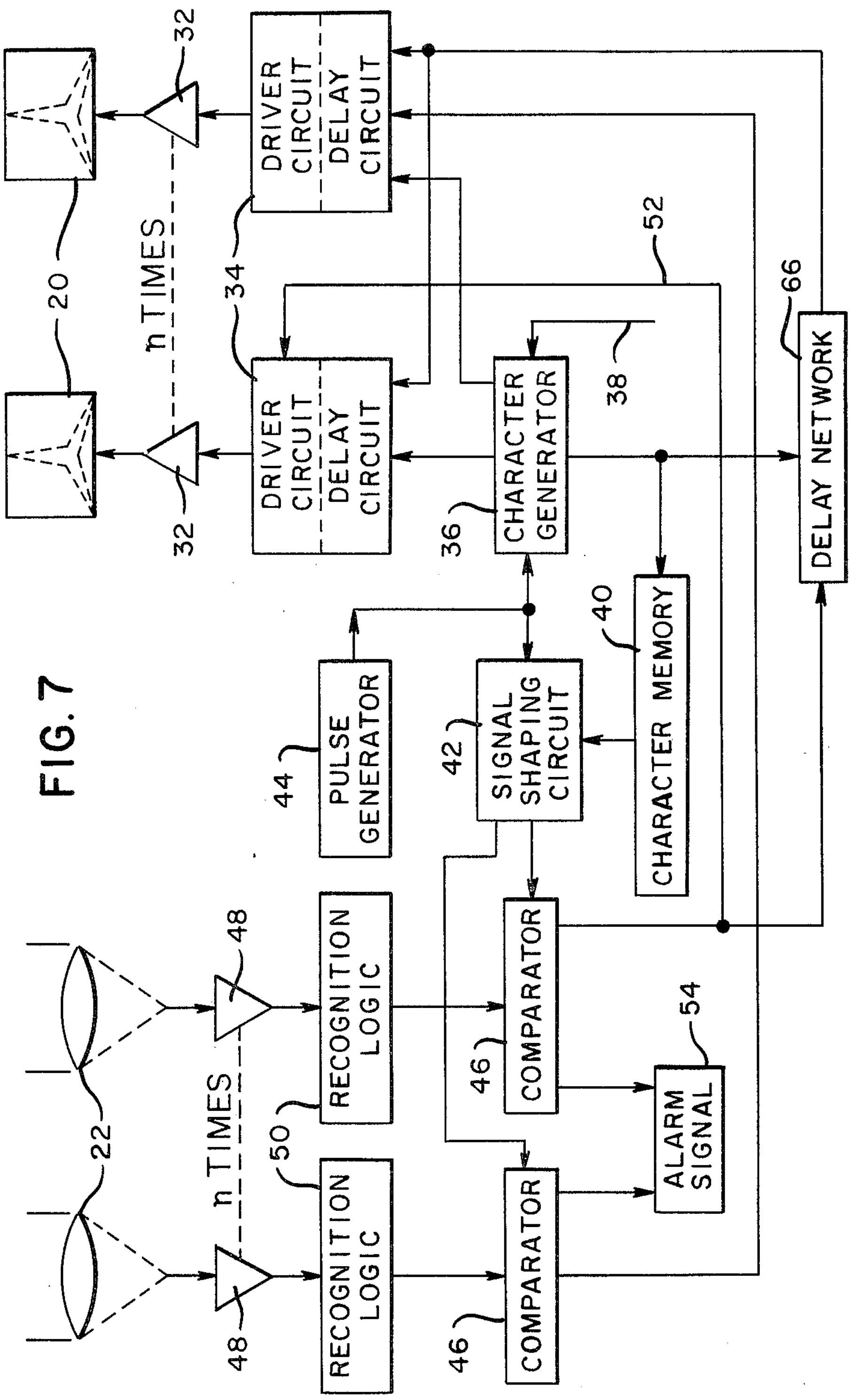
FIG. 7 is a view of the arrangement of the delay network for a plurality of ink nozzles.

FIG. 7 shows an arrangement of the delay network for a plurality of ink nozzles or spray devices in a print head 20 having a multi-nozzle plate or for a plurality of print heads each having a single nozzle and including an amplifier 32 connected to a driver circuit 34 for each of the nozzles. The time of ejecting ink droplets from the nozzles also aids in determining the point of impact of the droplets in forming the ink spots. In this manner it is possible to control each of the nozzles through the delay network 66 and the individual control of the delay circuit to each nozzle. The signals of the generated characters may be timely delayed at different times through the character memory 40 so as to affect the electrical signals for energizing the piezoelectric drivers.

Figure 8:
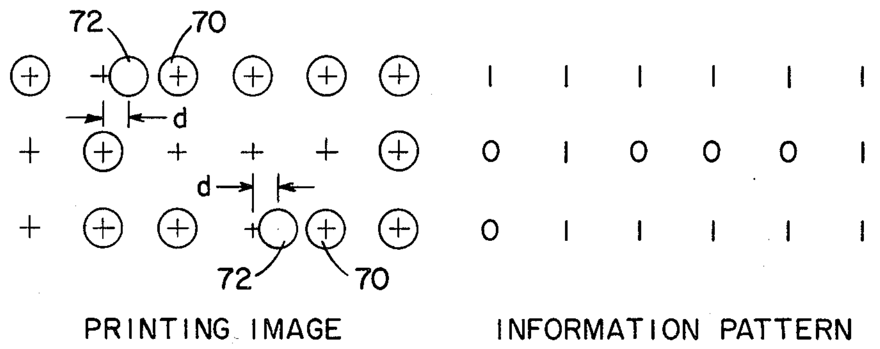
FIG. 8 is a view of a pattern of ink spots influenced by preceding spots.

FIG. 8 shows a pattern of ink spots 70 with the desired positions being an equal distance from each other and showing an error condition wherein two of the ink spots 72 have been influenced by a preceding ink droplet. The position of an ink spot or dot also depends upon whether a droplet is ejected onto the paper 10 just prior to a supervised ink droplet. According to the dot sequence for making up a dot matrix character, a droplet ejection time with the delay circuits shown in FIG. 7 must be precisely controlled and the position of the influenced ink spots or dots 72 may be again or further corrected. Alterations of the deviation "d" of the influenced spots 72 can be eliminated by means of the optical measuring device 22. The right side portion of FIG. 8 shows an information pattern of the ink spots 70 and 72 on the paper 10. Another possibility for correction is to provide fixed or predetermined correction patterns in the character generator 36 of FIG. 5 for certain symbols or characters. It is seen that either the correction patterns in the character generator 36 of FIG. 5 or the delay network of FIG. 7 may be adapted to the actual state or position of the ink dots as supplied by the optical measuring device 22.

Figure 9:
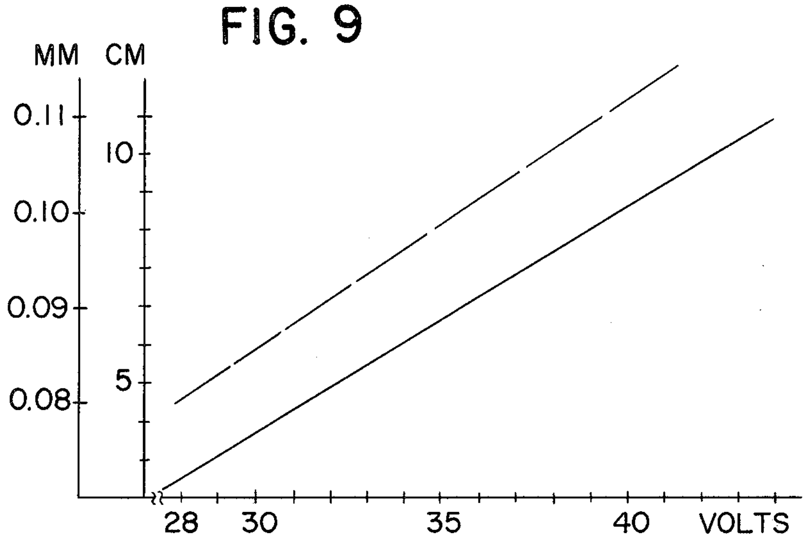
FIG. 9 is a graph showing the influence of the drive element on the size of the ink droplet.

Another condition or trouble source is that the ink spot on the paper does not correspond with the desired size of the ink spot or dot. A remedy for this condition is by means of respective alteration of the driving conditions of the drive elements or piezoelectric crystals in the print heads, wherein a lesser amount or a greater amount of ink is ejected from the nozzle. FIG. 9 is a graph showing the influence of the operating voltage of the piezoelectric drive elements in relation to the size of the ink droplet. The graph posts a range of 28 to 44 volts with an ink droplet diameter of 0.08 to 0.11 millimeters at a spray distance of 2 to 12 centimeters. The broken line of the graph represents the diameter of the ink droplet and the solid line represents the spray distance. This feature of the invention can be used to compensate for different absorbency of various types of paper at high speed printing.

Figure 10:
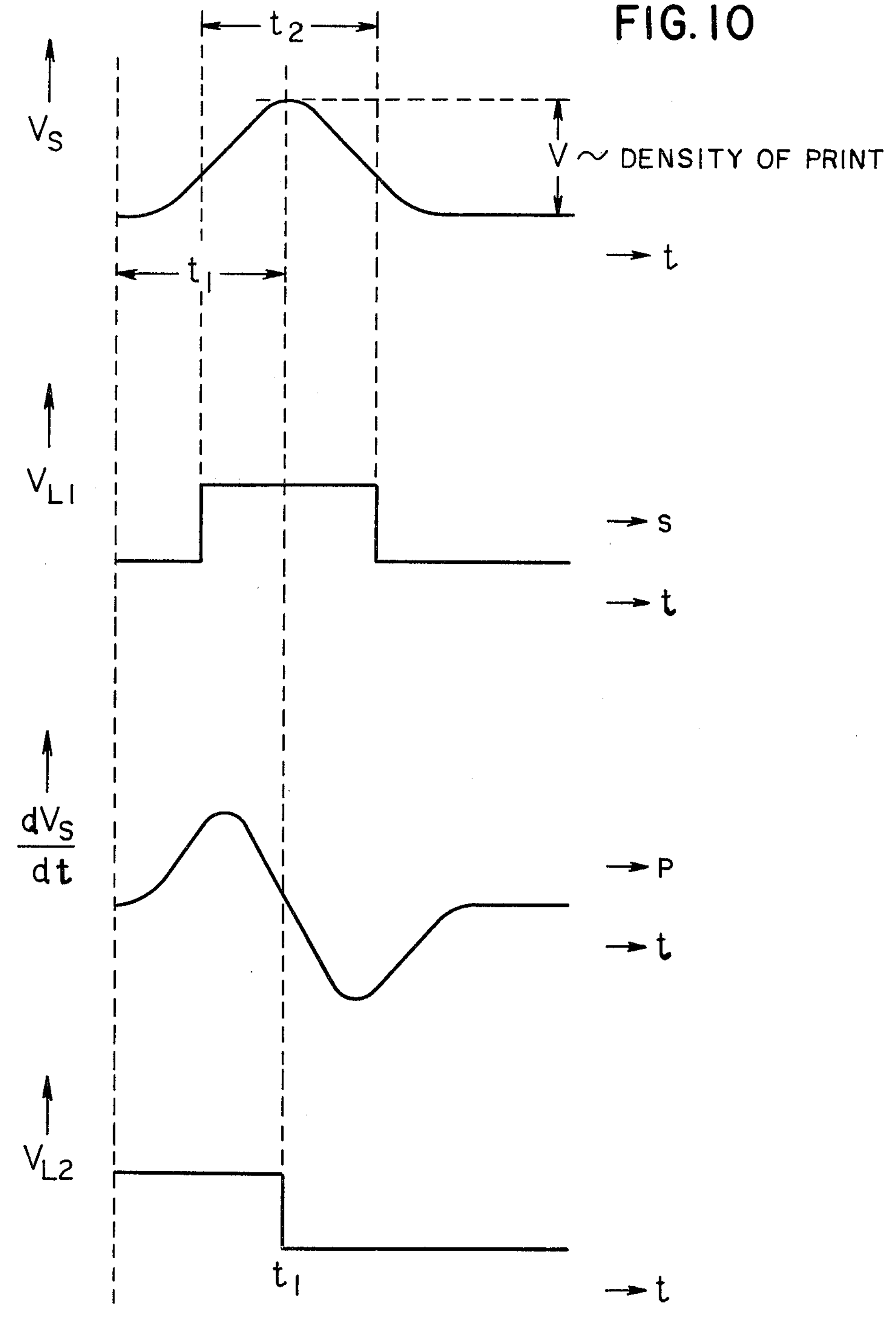
FIG. 10 is a graph showing the signal shapes utilized in the control logic.

FIG. 10 shows the shape of the several signals or voltage pulses relative to time t utilized in the recognition logic 50 and the comparator 46 (FIG. 5). The signal $V_S$ is an output signal of the preamplifier 48 and indicates a digital signal size, the duration of the signal being equal to an analog value of the dot size and indicating that the signal or pulse approximates the density of print. $V_{L1}$ is an output signal of a trigger element of the recognition logic 50 and ($dV_S/dt$) is an output signal of an R-C circuit of the recognition logic and is an indication of signal position P. $V_{L2}$ is an output signal of a set-reset flip-flop.

Figure 11:
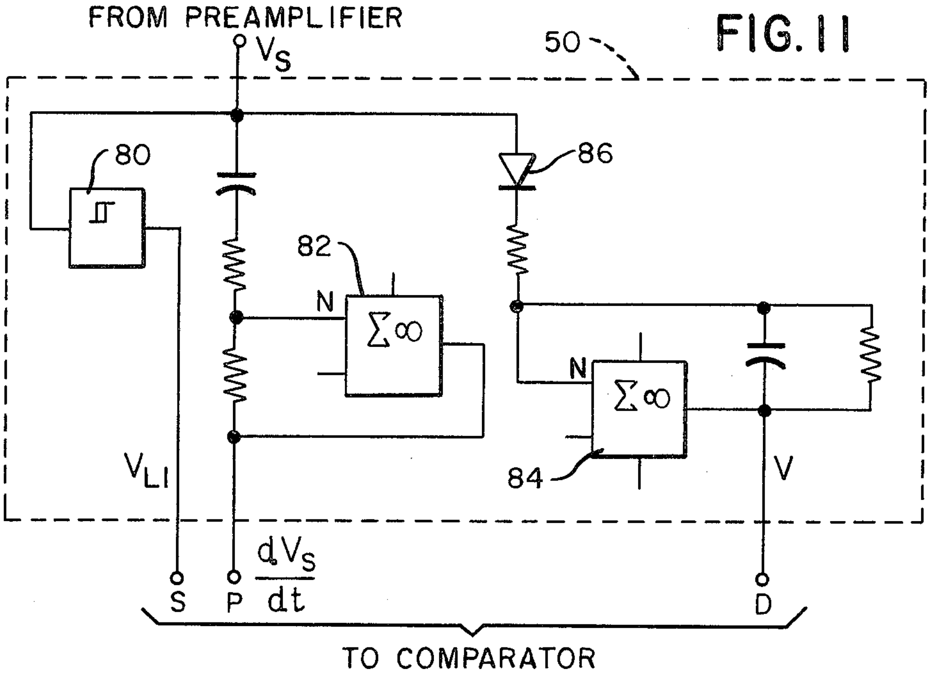
FIG. 11 shows an arrangement of elements for the recognition logic.

FIG. 11 illustrates an arrangement of elements for the recognition logic 50 wherein the pulse or signal $V_S$ is received from the preamplifier 48, as seen in FIGS. 5 and 7. The signal $V_S$ is provided as an input to a schmitt trigger 80, an input to a summing operational amplifier 82 and an input to a summing operational amplifier 84, which input includes a diode 86.

Figure 12:
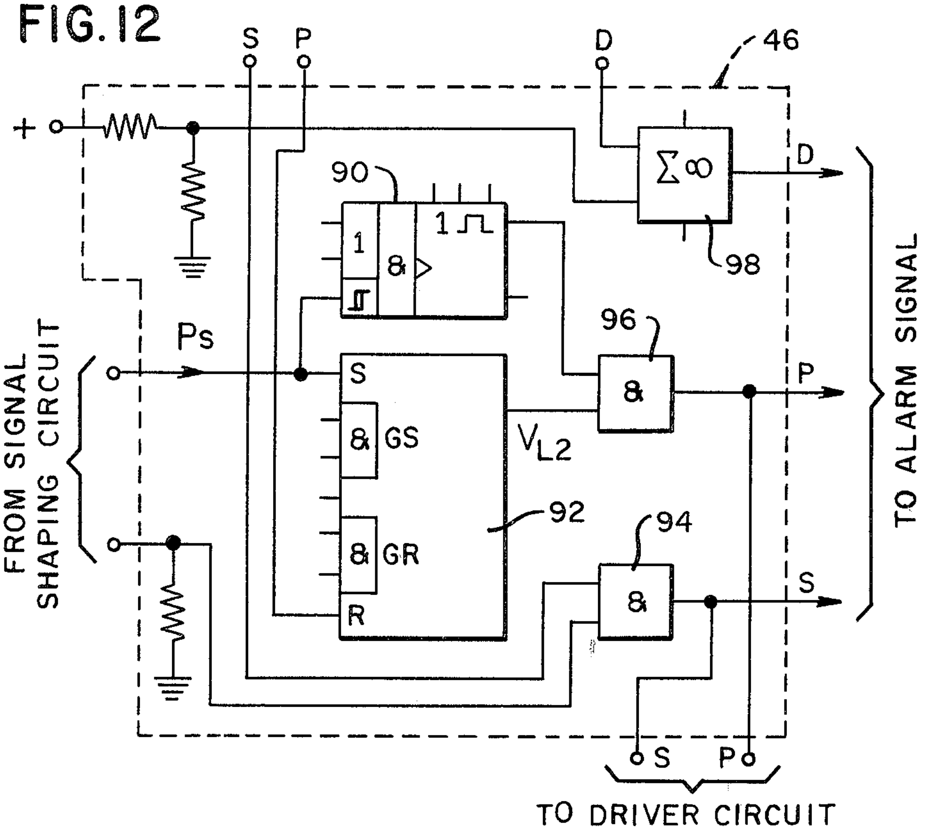
FIG. 12 shows an arrangement of elements for the comparison of actual signals with desired signals.

The outputs of these elements are provided as inputs to the comparator 46, shown in detail in FIG. 12, and designated as signal position P, signal density D and signal size S. One output from the signal shaping circuit 42 is provided as an input to a monostable element 90 and to the set-reset flip-flop 92. A second output from the signal shaping circuit 42 is input to an AND gate 94 along with signal S. Signal P is provided as a second input to the flip-flop 92, the output of which is $V_{L2}$ provided as one input to an AND gate 96, the other input being provided from the output of element 90. The density signal D is provided as one input to a summing operational amplifier 98 with a second input being a fixed voltage pulse. The outputs of the elements 94, 96 and 98 are made available to the alarm signal 54 and the outputs of AND gates 94 and 96 are provided to the driver circuit 34. Summarily, the comparator 46 compares the signal from the recognition logic 50 with the desired value of the signal from the signal shaping circuit 42 and then provides the difference between these signals to the driver circuit 34 and to the alarm signal generator 54.

Figure 13:
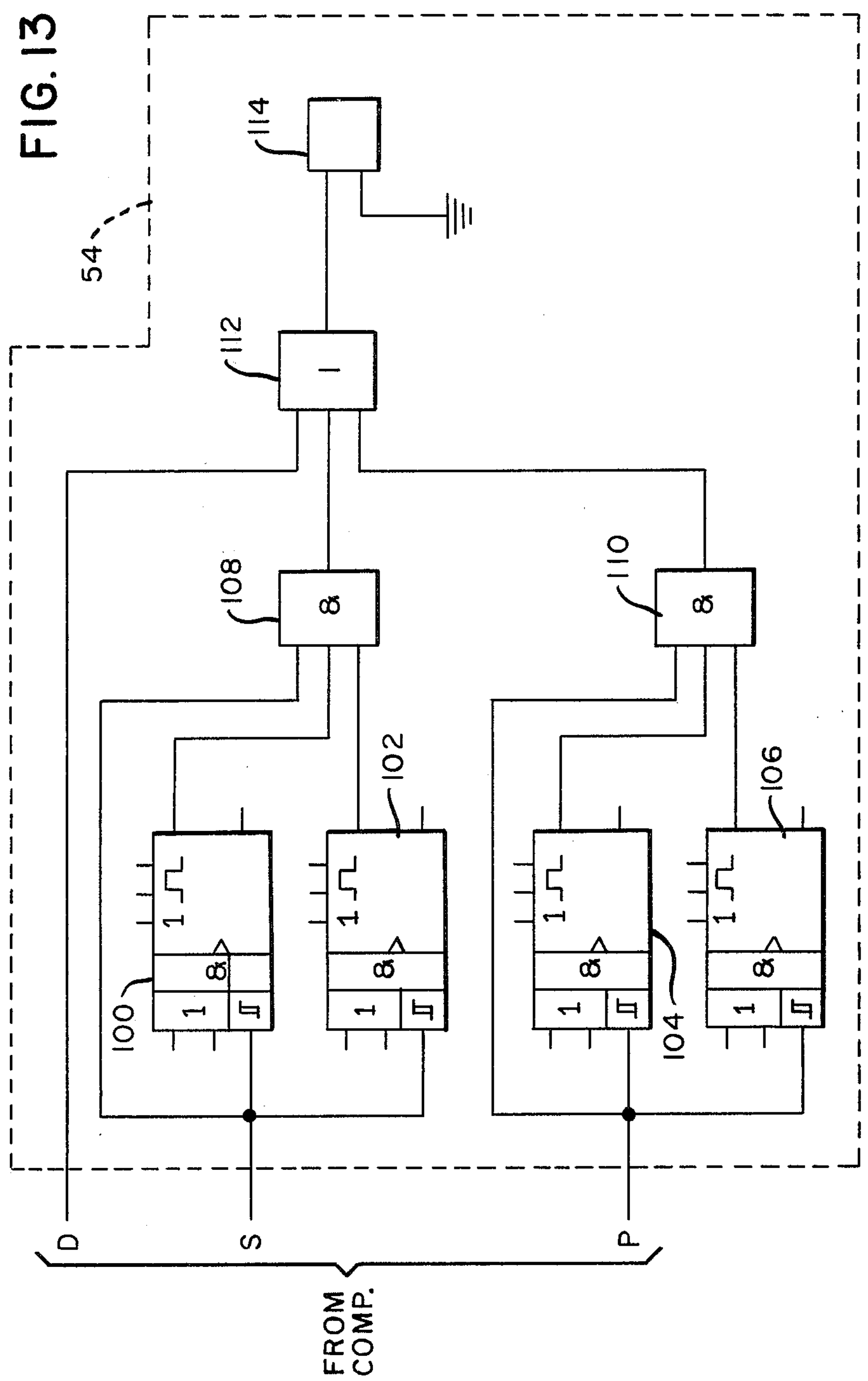
FIG. 13 shows an arrangement of elements for the alarm signal.

The alarm signal 54 is illustrated in FIG. 13 as including a pair of monostable elements 100 and 102 receiving input signals S and a pair of monostable elements 104 and 106 receiving input signals P. The outputs of elements 100 and 102 are provided as inputs to an AND gate 108 along with the signal S, and the outputs of elements 104 and 106 are provided as inputs to an AND gate 110 along with the signal P. The outputs of AND gates 108 and 110 along with a signal D are provided as inputs to an OR gate 112, the output of which is the input of an alarm 114.

Figure 14:
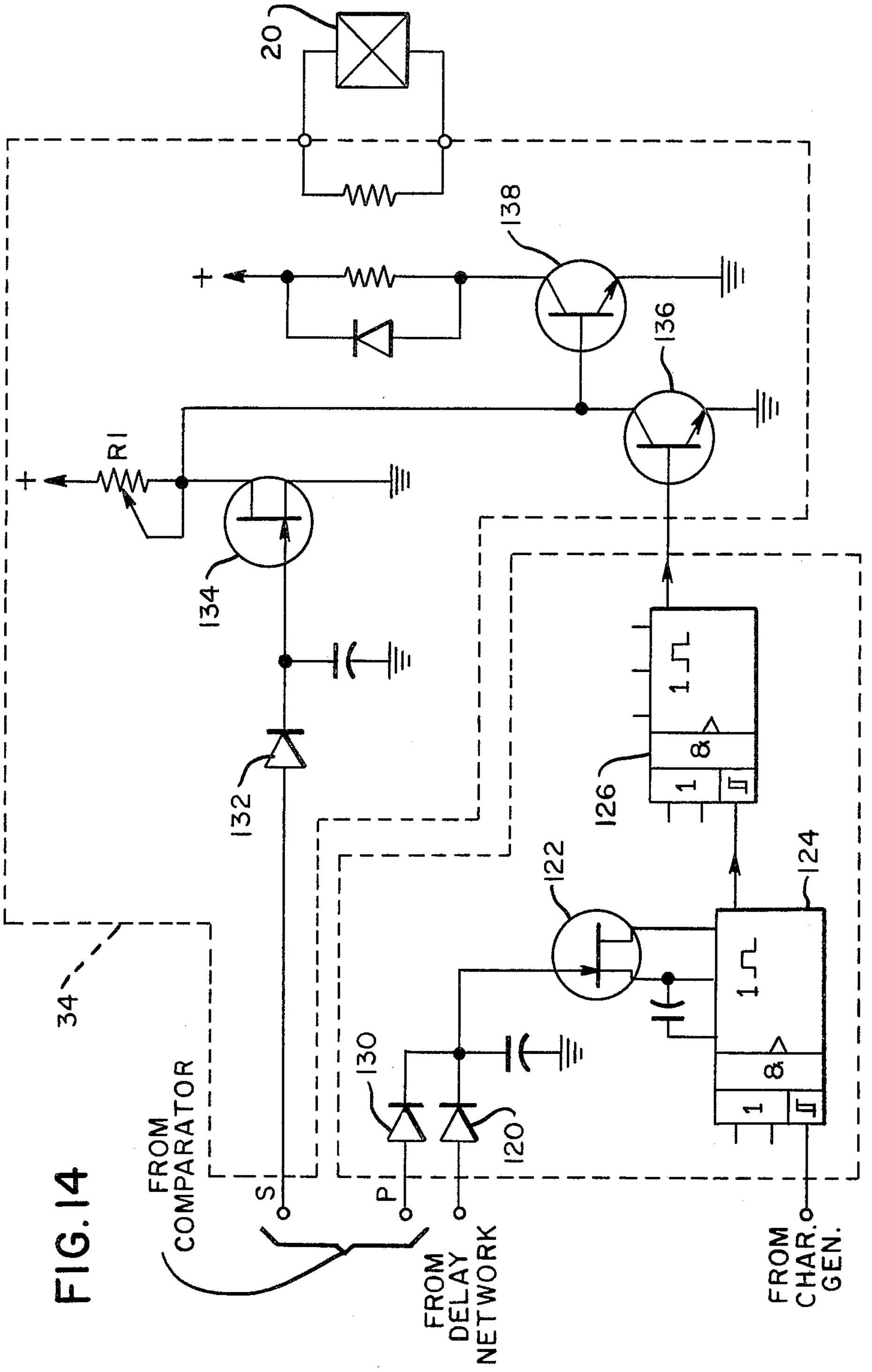
FIG. 14 shows an arrangement of elements for the network of the driver circuit and the delay circuit.

FIG. 14 illustrates an arrangement of elements for the delay circuit and for the driver circuit 34. A signal output from the delay network 66 is provided through a diode 120 as an input to a field effect transistor 122 connected to a monostable element 124. An input to such element 124 is a signal from the character generator 36. The output of element 124 is connected as an input to a monostable element 126. The P signal from the comparator 46 is connected through a diode 130 and to the transistor 122, and the S signal from the comparator 46 is connected through a diode 132 to a field effect transistor 134. The output from element 126 is provided as an input to the base of a transistor 136 and a lead from transistor 134 is connected as an input to a transistor 138. The difference between the detected signal and the desired signal controls the gate voltage of the field effect transistor 134 and this transistor controls the collector current of transistor 138, which current is directly proportional to the voltage height on the piezo element of the print head 20. The driver circuit 34 provides the pulse for driving the piezo element of the print head 20.

It should be here mentioned that the summary delay of the excitation pulse to the piezo drive element for the print head 20 is dependent upon the "multi-drop-behavior" concept and upon the error signals of the comparator 46. This behavior concept refers to irregularities in emission of ink droplets during the first 2–10 drops of a burst and prior to a uniform drop emission. Corrections for irregularities caused by this behavior, which in turn may depend upon the character to be printed, can be stored in the character generator 36 which sends a trigger signal to the monostable element 124. The pulse duration of element 124 is determined by signals from the delay network 66 and from the recognition logic 50. The individual delay is a function of the capacity of the monostable element 124 and the electrical resistance between the source and the drain of the transistor 134 which resistance is controlled by the gate voltage.

The logic design for signal shapes as shown in FIG. 10 and for the required information as to the height, width and the delay of the electrical pulse from the preamplifier 48 is illustrated in one manner and method by FIGS. 11–14. An alternative manner and method for extraction of the desired information is by means of an analog/digital converter which supplies digital data to a microprocessor running on a software program.

In certain cases the optical properties of the ink spots or dots relative to the contrast or reflection characteristics in a certain part of the light spectrum are not sufficient to require the parameters for precise correction. In other cases the contrast of the ink spots can be effected and advantageously corrected by alteration of the driving conditions of the drive elements to control the quantity of ink ejected from the nozzles. Another means of effecting contrast or reflection of the ink spots or dots is to regulate the composition of the ink with a solvent so as to change the concentration of the ink ejected onto the paper 10 and thereby influence the reflection characteristic of the ink relative to a desired spectrum range.

It is thus seen that herein shown and described is supervision apparatus in the nature of optical sensing of ink spots or marks on paper or like record media. The sensing or detecting scheme includes the existence of ink dots, the position of the ink dots, the size thereof and the condition of each ink dot so that corrections or alterations can be made in the printing operation. The apparatus of the present invention enables the accomplishment of the objects and advantages mentioned above and, while a preferred embodiment of the invention has been disclosed herein, variations may occur to those skilled in the art. It is contemplated that all variations and modifications not departing from the spirit and scope of the invention hereof are to be construed in accordance with the following claims.

We claim:

1. A system for supervising printing of characters in non-impact manner comprising at least one printing element movable along a line of printing, means for actuating said printing element for printing said characters, means for generating signals indicative of characters to be printed, means for shaping the character generated signals into optical signals capable of being optically produced, means for optically sensing said printed characters and providing signals thereof, means for comparing said optical signals with said printed character signals, and means for altering the actuation of said printing element to correct the printing of characters where said optical signals do not correspond with said printed character signals.

2. The system of claim 1 including means for generating signals in pulsation manner for driving said printing element.

3. The system of claim 1 including memory means for delaying the character generated signals for supplying to said shaping means.

4. The system of claim 1 including logic means for recognizing the signals of the printed characters.

5. The system of claim 1 including means for carrying said printing element and said optically sensing means along said line of printing.

6. The system of claim 1 including alarm signal means for indicating insufficient correction of the printing of characters.

7. The system of claim 1 wherein said printing element is a piezoelectric actuated ink jet print head.

8. The system of claim 1 wherein said printing element comprises an ink jet print head and said optical sensing means is a sensor carried on one side of said print head along said line of printing.

9. The system of claim 1 wherein said printing element comprises an ink jet print head and said optical sensing means comprises a sensor on each side of said print head and carried along said line of printing.

10. The system of claim 1 wherein said printing element comprises an ink jet print head and said optical sensing means comprises a sensor carried in a vertical plane with said print head along said line of printing.

11. Apparatus for supervising non-impact printing of characters comprising a print element carried along a line of printing, drive means for actuating said print element for printing of characters, a character generator for indicating desired characters to be printed, means for shaping characters from said character generator in a format capable of being optically produced, optical sensing means for sensing the actual printed character, means for comparing the actual printed character with the desired character to be printed, and means for altering the drive means to correct the actual printing of characters in accordance with the desired format when the actual characters printed do not correspond with the desired character printing.

12. The apparatus of claim 11 including a generator for pulsing signals for the drive means.

13. The apparatus of claim 11 including character memory means for delaying the desired generated characters.

14. The apparatus of claim 11 including recognition logic means for said printed characters.

15. In an jet printer having a print head for ejecting droplets of ink in dot matrix manner onto adjacent record media, means for supervising the ink dots of said matrix comprising means for generating signals of characters desired to be printed, circuit means receiving said generated signals and forming thereof into signals capable of being optically produced, optical sensing means for sensing the actual ink dots printed, a comparator for comparing the generated signals with the printed dots, and means for correcting the actuation of said print head for altering the printing of said characters when the printed characters do not correspond with the desired character printing.

16. In the ink jet printer of claim 15 including a generator for pulsing drive signals to the print head.

17. In the ink jet printer of claim 15 including character memory means for delaying the generated signals prior to receipt by said circuit means.

18. In the ink jet printer of claim 15 including logic means for recognizing the signals of the printed characters for optically sensing thereof.

* * * * *